United States Patent

(12) United States Patent
Ikegami

(10) Patent No.: US 11,483,220 B2
(45) Date of Patent: Oct. 25, 2022

(54) QUALITY ESTIMATION APPARATUS, QUALITY ESTIMATION METHOD AND PROGRAM

(71) Applicant: Nippon Telegraph and Telephone Corporation, Tokyo (JP)

(72) Inventor: Daisuke Ikegami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/252,398

(22) PCT Filed: May 13, 2019

(86) PCT No.: PCT/JP2019/018856
§ 371 (c)(1),
(2) Date: Dec. 15, 2020

(87) PCT Pub. No.: WO2019/244507
PCT Pub. Date: Dec. 26, 2019

(65) Prior Publication Data
US 2021/0266241 A1    Aug. 26, 2021

(30) Foreign Application Priority Data
Jun. 18, 2018    (JP) .............................. JP2018-115165

(51) Int. Cl.
| G06F 15/173 | (2006.01) |
| H04L 43/067 | (2022.01) |
| H04L 43/04 | (2022.01) |
| H04L 43/0852 | (2022.01) |
| H04L 67/02 | (2022.01) |

(52) U.S. Cl.
CPC ............ *H04L 43/067* (2013.01); *H04L 43/04* (2013.01); *H04L 43/0858* (2013.01); *H04L 67/02* (2013.01)

(58) Field of Classification Search
None
See application file for complete search history.

(56) References Cited

U.S. PATENT DOCUMENTS

| 9,866,313 B1 * | 1/2018 | Murphy ................. G08G 5/003 |
| 9,923,793 B1 * | 3/2018 | Gore .................... H04L 43/0876 |
| 2016/0094615 A1 * | 3/2016 | Wiener .................. H04L 67/32 709/217 |
| 2017/0237635 A1 * | 8/2017 | Veeravalli ........... G06F 16/9535 709/224 |

(Continued)

FOREIGN PATENT DOCUMENTS

JP    2016-139191    8/2016

OTHER PUBLICATIONS

W3.org, [online], "Navigation Timing," Dec. 17, 2012, retrieved on May 9, 2018, retrieved from URL<http://www.w3.org/TR/navigation-timing/>, 14 pages.

*Primary Examiner* — Quang N Nguyen
(74) *Attorney, Agent, or Firm* — Fish & Richardson P.C.

(57) ABSTRACT

A quality estimation apparatus includes an acquisition unit for acquiring a set of web page loading latencies, and a calculation unit for calculating a probability that a quality of experience value is a predetermined value or more for each latency in the set, as a probability that the quality of experience value is the predetermined value or more for the set, and enables estimation of the user experience quality for the set of web page loading latencies.

7 Claims, 3 Drawing Sheets

(56) References Cited

U.S. PATENT DOCUMENTS

2017/0237799 A1\* 8/2017 Veeravalli ............... H04L 43/08
                                                    709/224
2018/0102831 A1\* 4/2018 Murphy ................ H04W 76/11

\* cited by examiner

QUALITY ESTIMATION APPARATUS, QUALITY ESTIMATION METHOD AND PROGRAM

CROSS-REFERENCE TO RELATED APPLICATIONS

This application is a National Stage application under 35 U.S.C. § 371 of International Application No. PCT/JP2019/018856, having an International Filing Date of May 13, 2019, which claims priority to Japanese Application Serial No. 2018-115165, filed on Jun. 18, 2018. The disclosure of the prior application is considered part of the disclosure of this application, and is incorporated in its entirety into this application.

TECHNICAL FIELD

The present invention relates to a quality estimation apparatus, a quality estimation method, and a program.

BACKGROUND ART

The development of communication networks accompanies the diffusion of communication services that transfer various contents over the network. Such communication services includes voice communication, video communication, and web. In particular, the progress and sophistication of web technology has allowed for the creation of a large number of web pages that include a wide variety of contents and complex processing.

In the communication on the network, data is divided into packets and transmitted, such that communication is strongly affected by constraints of the circuit band of the network, and by the location and/or order of a packet where congestion, packet loss, or the like are generated. Thus, it is known that the transfer time of the identical contents varies even in an identical network state.

In order to confirm that the network operator is providing a good quality web service, it is important to measure web loading latency for loading a web page for each user and monitor the quality of service offered by the communication network. In addition, when the network operator monitors the quality of the service, it is important to estimate not only the actual web loading latency but also how the latency is perceived as the user experience quality.

To improve the quality of the communication service, the network operator can use the estimation of the above-mentioned user experience quality to make capital spending preferentially on areas of relatively poor quality, thereby efficiently constructing equipment. For this reason, a technique is required for estimating the user experience quality from measured values of the actual web loading latency for each area.

Conventionally, Navigation Timing API (Non Patent Literature 1) capable of performing measurements on terminals has been used to determine the web loading latency. The API acquires each timing of web page loading from the browser to estimate the web loading latency.

Patent Literature 1 discloses a model using a web loading latency of a web page as an input to estimate Quality of Experience (QoE) according to the applicable QoE estimation model by category.

CITATION LIST

Patent Literature

Patent Literature 1: JP-2016-139191 A

Non Patent Literature

NPL1: Navigation Timing, W3C Recommendation, internet URL: https://www.w3.org/TR/navigation-timing/

SUMMARY OF THE INVENTION

Technical Problem

Navigation Timing API can measure the web loading latency, but has a difficulty in evaluating the user's quality of experience.

Additionally, according to the invention of Patent Literature 1, it is possible to receive an input of the web page loading latency and estimate the QoE according to the applicable QoE estimation model by category, but the web loading latency varies even when the state of the network is the same. For this reason, to perform a quality evaluation in an area, it is contemplated to make multiple measurements and evaluate the average quality. However, when the web loading latency measurement is performed multiple times, a set of web loading latencies having different values are acquired and thus, it is difficult to estimate the user experience quality for the set.

In light of the foregoing, an object of the present invention is to estimate the user experience quality for a set of web loading latencies.

Means for Solving the Problem

In order to solve the above problem, a quality estimation apparatus includes an acquisition unit for acquiring a set of web page loading latencies, and a calculation unit for calculating a probability that a quality of experience value is a predetermined value or more for each latency in the set, as a probability that the quality of experience value is the predetermined value or more for the set.

Effects of the Invention

The user experience quality for a set of web loading latencies can be estimated.

DESCRIPTION OF EMBODIMENTS

Figure 1:
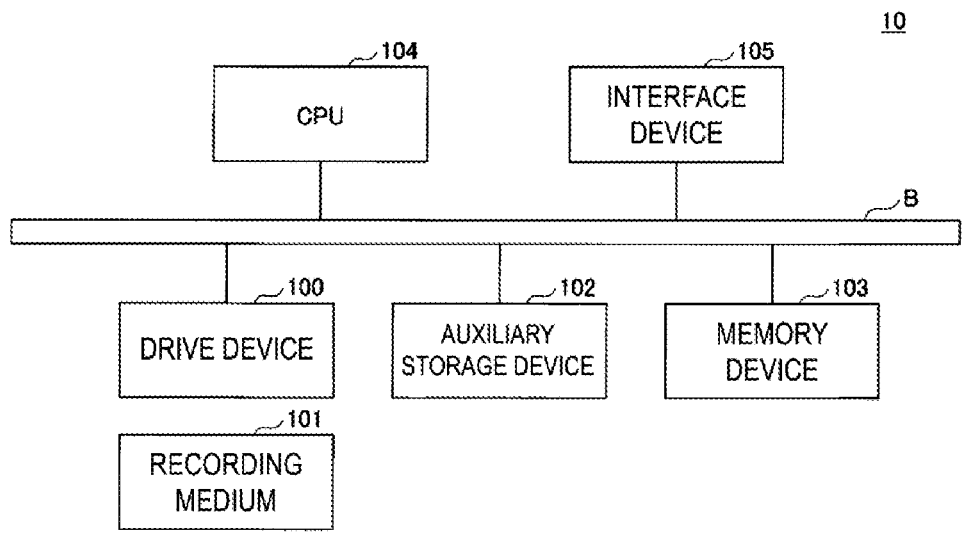
FIG. 1 is a diagram illustrating an example of a hardware configuration of a quality estimation apparatus 10 in accordance with a first embodiment.

Hereinafter, a first embodiment will be described with reference to drawings. FIG. 1 is a diagram illustrating an example of a hardware configuration of a quality estimation apparatus 10 in accordance with the first embodiment. The quality estimation apparatus 10 in FIG. 1 includes a drive device 100, an auxiliary storage device 102, a memory device 103, a central processing unit (CPU) 104, an interface device 105, and the like, which are connected to each other via a bus B.

A program for enabling the quality estimation apparatus 10 to perform processing is provided from a recording medium 101 such as a CD-ROM. When the recording medium 101 storing a program is set in the drive device 100, the program is installed in the auxiliary storage device 102 from the recording medium 101 through the drive device 100. However, the program is not necessarily installed from the recording medium 101 and may be downloaded from another computer through a network. The auxiliary storage device 102 stores the installed program and stores necessary files, data, and the like.

When an instruction for starting up the program is given, the memory device 103 reads a program from the auxiliary storage device 102 and stores the program. The CPU 104 performs functions related to the quality estimation apparatus 10 in accordance with the program stored in the memory device 103. The interface device 105 is used as an interface for connection to a network.

Figure 2:
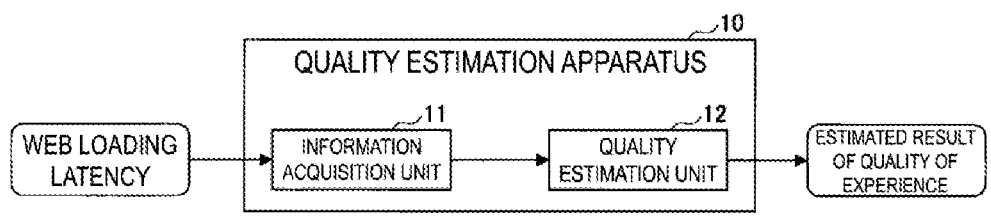
FIG. 2 is a diagram illustrating an example of a functional configuration of the quality estimation apparatus 10 in accordance with the first embodiment.

FIG. 2 is a diagram illustrating an example of a functional configuration of the quality estimation apparatus 10 in accordance with the first embodiment. In FIG. 2, the quality estimation apparatus 10 includes an information acquisition unit 11 and a quality estimation unit 12. Each of these units is implemented by processing that one or more programs installed on the quality estimation apparatus 10 cause the CPU 104 to execute.

Figure 3:
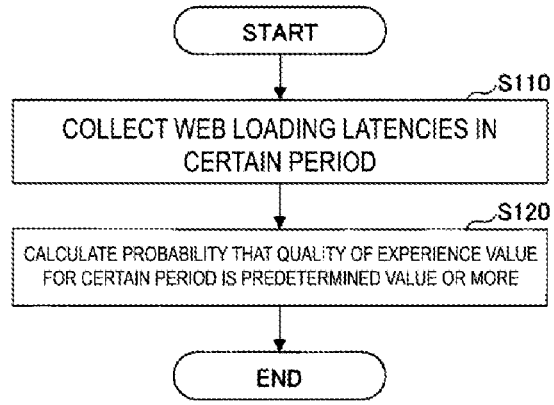
FIG. 3 is a flowchart for describing an example of a processing procedure performed by the quality estimation apparatus 10 in accordance with the first embodiment.

A processing procedure performed by the quality estimation apparatus 10 will be described below. FIG. 3 is a flowchart for describing an example of the processing procedure performed by the quality estimation apparatus 10 in accordance with the first embodiment.

In a step S110, the information acquisition unit 11 acquires a set of web loading latencies (web loading latencies in a sample sequence $G'=\{g_1, g_2, \ldots, g_N\}$) measured in a certain period (hereinafter referred to as "estimation target period") in an area (hereinafter referred to as "estimation target area"). Here, the estimation target period may be a continuous time length such as one minute, five minutes, one hour, or the like, or may be a sum-set of discrete periods such as a certain time frame (for example, 07:00 to 08:00) in a longer period including a certain shorter period on a cyclical basis (for example, one week, one month, one year, or the like). The terminals (users) to be measured in terms of each web loading latency may all be different, the same, or partially same. In addition, a method for acquiring the web loading latency is not limited to any predetermined method. For example, the latency may be transmitted from each terminal to the information acquisition unit 11, or may be acquired from a database or the like that stores a set of web loading latencies.

Note that the web loading latency refers to the user's latency for loading the web page (time taken from a user's instruction to display a web page to the completion of display of the web page).

Also, web loading latencies in the sample sequence $G'=\{g_1, g_2, \ldots, g_N\}$ may all be different from each other, or some of the web loading latencies may be the same.

Next, the quality estimation unit 12 uses a predefined function $F_i(x)$ for the sample sequence $G'=\{g_1, g_2, \ldots, g_N\}$ of the web loading latencies acquired by the information acquisition unit 11, and for the estimated target period in the estimation target area, calculates a probability (on estimated value basis) that a quality of experience (QoE) value, which indicates the user's QoE, is i or more according to a following formula (S120).

$$\sum_{j=1}^{N} \frac{1}{N} F_i(g_j)$$ [Math. 1]

That is, the above formula calculates the probability that the quality of experience value is i or more for each web loading latency in the sample sequence G'.

Here, the quality of experience value is a value of an index indicating, for example, the user experience quality for the web loading latency by multiple grades (e.g., five or ten grades), and a larger value indicates a higher quality of experience. For example, in the case of five grades, the quality of experience value is 1, 2, 3, 4, or 5.

$F_i(x)$ is a QoE evaluation characteristic function for outputting a probability that the quality of experience value is i or more for the web loading latency x, and is defined for every i. For example, the QoE evaluation characteristic function may be derived based on data empirically acquired by performing a subjective evaluation experiment on a plurality of participating users (a set of users' quality of experience values for web latency).

The probability calculated in the step S120 is an index for estimating the user experience quality for a set of web loading latencies having different values in the present embodiment.

Note that any one value or a plurality of values may be specified for i. When a plurality of values are specified, in step S120, an estimated value of the probability is calculated for every i.

As described above, according to the first embodiment, the user experience quality can be estimated for a set of web loading latencies having different values.

Therefore, according to the present embodiment, the quality of experience for the web loading latency within a specific period in any estimation target area can be monitored and managed, which contributes to an improvement in the area quality, while the related art could not estimate the quality of experience for a set of web loading latencies.

Note that, in the above description, the estimation target area is one, but the processing procedure illustrated in FIG. 3 may be executed on a plurality of estimation target areas. Alternatively, the web loading latency may be acquired without specifying the estimation target area. In this case, a range of sources providing the web loading latency is the estimation target area.

Next, a second embodiment will be described. Differences between the second embodiment and the first embodiment will be described. Points not particularly described in the second embodiment may be the same as in the first embodiment.

Figure 4:
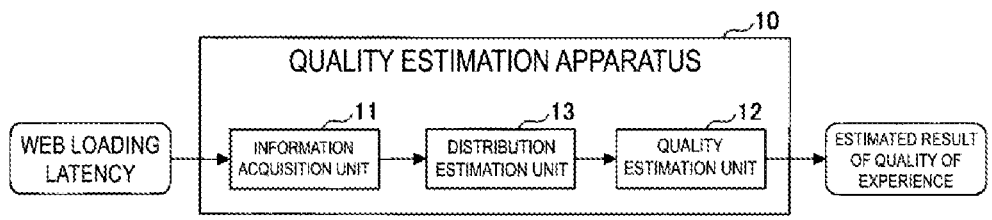
FIG. 4 is a diagram illustrating an example of a functional configuration of the quality estimation apparatus 10 in accordance with a second embodiment.

FIG. 4 is a diagram illustrating an example of a functional configuration of a quality estimation apparatus 10 in accordance with the second embodiment. In FIG. 4, parts that are the same as or corresponding to those in FIG. 2 are denoted by identical reference signs, and descriptions thereof will be omitted.

In FIG. 4, the quality estimation apparatus 10 includes a distribution estimation unit 13. The distribution estimation unit 13 is implemented by processing one or more programs installed on the quality estimation apparatus 10 cause the CPU 104 to execute.

Figure 5:
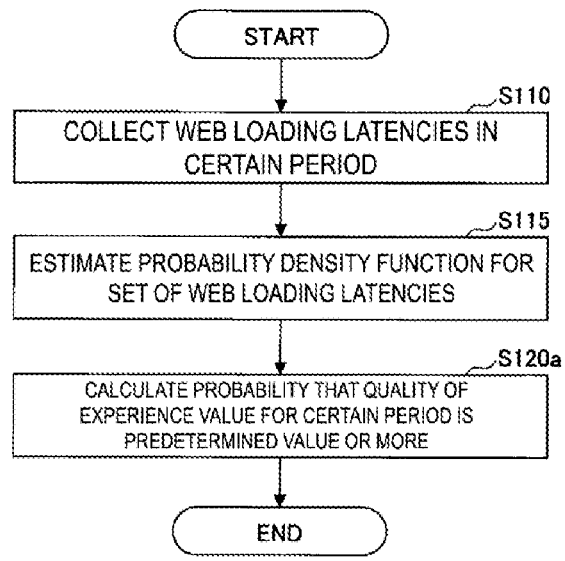
FIG. 5 is a flowchart for describing an example of a processing procedure performed by the quality estimation apparatus 10 in accordance with the second embodiment.

FIG. 5 is a flowchart for describing an example of the processing procedure performed by the quality estimation apparatus 10 in accordance with the second embodiment. In FIG. 5, the identical steps as those in FIG. 3 are denoted by the identical step numbers, and descriptions thereof will be omitted.

Following a step S110, the distribution estimation unit 13 estimates a probability density function g(x) for the sample sequence $G'=\{g_1, g_2, \ldots, g_N\}$ of the web loading latency acquired by the information acquisition unit 11 (S115). The probability density function g(x) may be estimated, for example, based on interpolation of the sample sequence $G'=\{g_1, g_2, \ldots, g_N\}$. Alternatively, the probability density function g(x) may be estimated by normal distribution for any value between a K1 percentile value and a K2 percentile value with respect to the sample sequence $G'=\{g_1, g_2, \ldots, g_N\}$, and by interpolation for the K2 percentile value or more. Note that when K1 is larger than 0, the probability density function g(x) may be estimated by interpolation for a value less than K1.

Subsequently, the quality estimation unit 12 calculates a probability (on estimated value basis) that the quality of experience value is i or more according to a following equation (S120a).

$$\int F_i(t) \cdot g(t) dt \qquad \text{[Math. 2]}$$

Note that t is a variable for the web loading latency. Here, the range of t may be 0 to ∞. This is because when t exceeds a certain value, the quality of experience value becomes constant (minimum).

As described above, according to the second embodiment, the identical effects as those of the first embodiment can be obtained.

Note that, in the present embodiment, the information acquisition unit 11 is an example of an acquisition unit. The quality estimation unit 12 is an example of a calculation unit. The distribution estimation unit 13 is an example of an estimation unit. The quality of experience value i is an example of a predetermined value.

The embodiment of the present invention has been described above in detail. However, the present invention is not limited to the specific embodiment and can be subjected to various modifications and changes within the scope of the gist of the present invention disclosed in the claims.

REFERENCE SIGNS LIST

10 Quality estimation apparatus
11 information acquisition unit
12 Quality estimation unit
13 Distribution estimation unit
100 Drive device
101 Recording medium
102 Auxiliary storage device
103 Memory device
104 CPU
105 Interface device
B bus

The invention claimed is:

1. A quality estimation apparatus comprising:
a memory device; and
a central processing unit coupled to the memory device, configured to execute:
an acquisition unit configured to acquire a set of web page loading latencies; and
a calculation unit configured to calculate a probability that a quality of experience value is a predetermined value or more than the predetermined value for each web page loading latency time in the set of web page loading latencies, as a probability that the quality of experience value is the predetermined value or more than the predetermined value for the set of web page loading latencies.

2. The quality estimation apparatus according to claim 1, wherein the calculation unit receives an input of the web page loading latency time, and uses a function of outputting the probability that the quality of experience value is the predetermined value or more than the predetermined value to calculate the probability that the quality of experience value is the predetermined value or more than the predetermined value.

3. A quality estimation method comprising:
acquiring a set of web page loading latencies; and
calculating a probability that a quality of experience value is a predetermined value or more than the predetermined value for each latency in the set of web page loading latencies, as a probability that the quality of experience value is the predetermined value or more than the predetermined value for the set of web page loading latencies.

4. A non-transitory computer-readable storage medium storing instructions, that when executed by a computer, cause the computer to function as an apparatus comprising:
a memory device;
a central processing unit, coupled to the memory device, configured to execute:
an acquisition unit configured to acquire a set of web page loading latencies; and
a calculation unit configured to calculate a probability that a quality of experience value is a predetermined value or more than the predetermined value for each latency time in the set of web page loading latencies, as a probability that the quality of experience value is the predetermined value or more than the predetermined value for the set of web page loading latencies.

5. A quality estimation apparatus comprising:
a memory device; and
a central processing unit coupled to the memory device, configured to execute:
an acquisition unit configured to acquire a set of web page loading latencies;
an estimation unit configured to estimate a probability density function for the set of web page loading latencies; and
a calculation unit configured to receive an input of each web page loading latency, and use a function of outputting a probability that a quality of experience value is a predetermined value or more than the predetermined value and the probability density function to calculate a probability that the quality of experience value is the predetermined value or more than the predetermined value for the set of web page loading latencies.

6. The quality estimation apparatus according to claim 5, wherein the calculation unit calculates a probability that the quality of experience value is i or more than i for the set of web page loading latencies according to a formula:

$$\int F_i(t) \cdot g(t) dt$$

where Fi(t) is a function of outputting a probability that the quality of experience value is i or more than i for a latency t, and g(t) is the probability density function.

7. A quality estimation method comprising:
acquiring a set of web page loading latencies;
estimating a probability density function for the set of web page loading latencies; and
receiving an input of each web page loading latency time, and using a function of outputting a probability that a quality of experience value is a predetermined value or more than the predetermined value and the probability density function to calculate a probability that the quality of experience value is the predetermined value or more than the predetermined value for the set of web page loading latencies.

\* \* \* \* \*